INVENTOR
LEON J. THOMPSON

June 27, 1967

L. J. THOMPSON 3,328,658

SYSTEM FOR CONTROLLING STEPPER MOTOR STARTING
AND STOPPING OPERATIONS

Filed July 2, 1964

INVENTOR
LEON J. THOMPSON

BY *Earl E. Hancock*

ATTORNEY

June 27, 1967   L. J. THOMPSON   3,328,658
SYSTEM FOR CONTROLLING STEPPER MOTOR STARTING
AND STOPPING OPERATIONS
Filed July 2, 1964   6 Sheets-Sheet 3

June 27, 1967 L. J. THOMPSON 3,328,658
SYSTEM FOR CONTROLLING STEPPER MOTOR STARTING
AND STOPPING OPERATIONS
Filed July 2, 1964 6 Sheets-Sheet 4
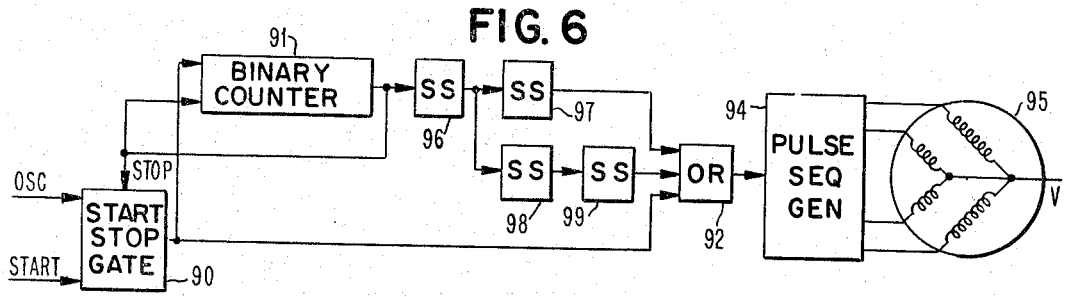
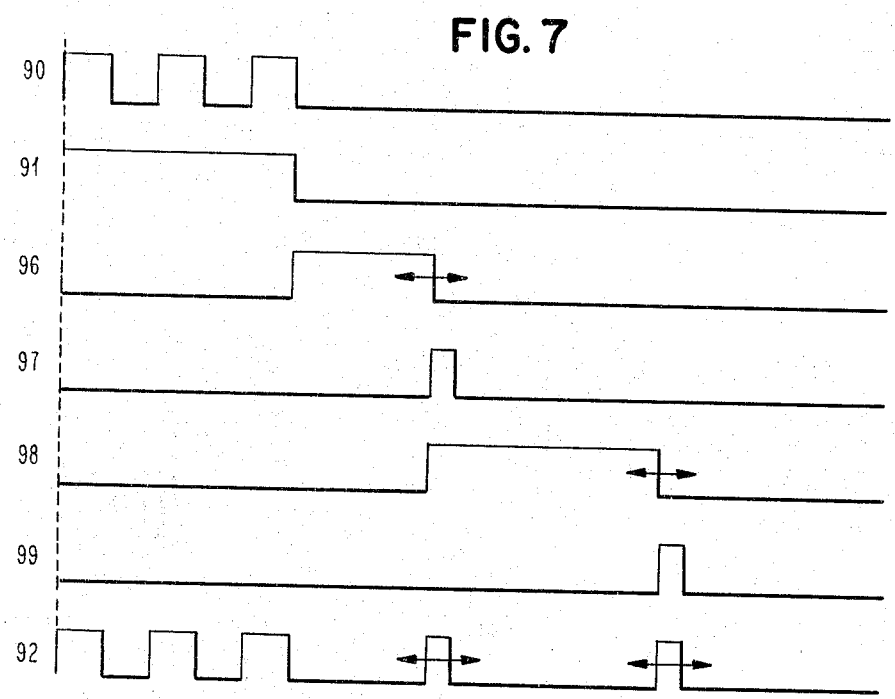
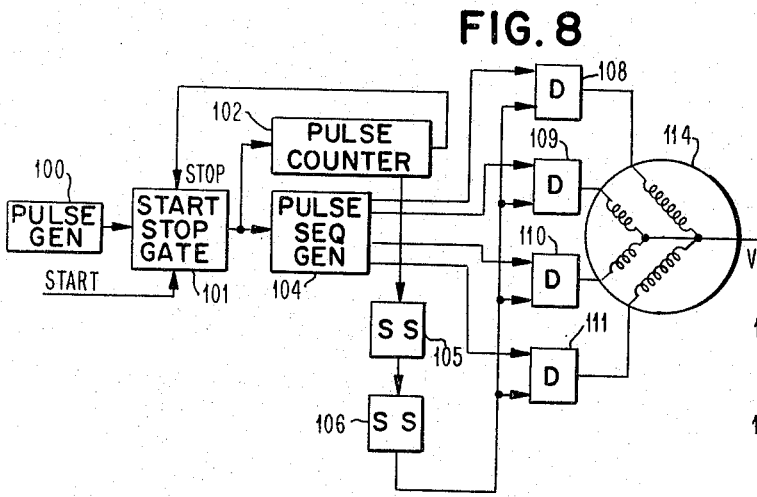
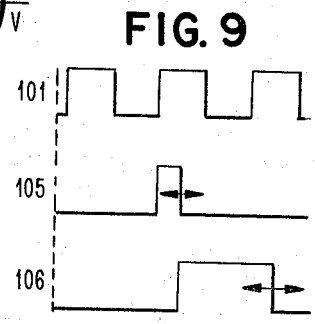

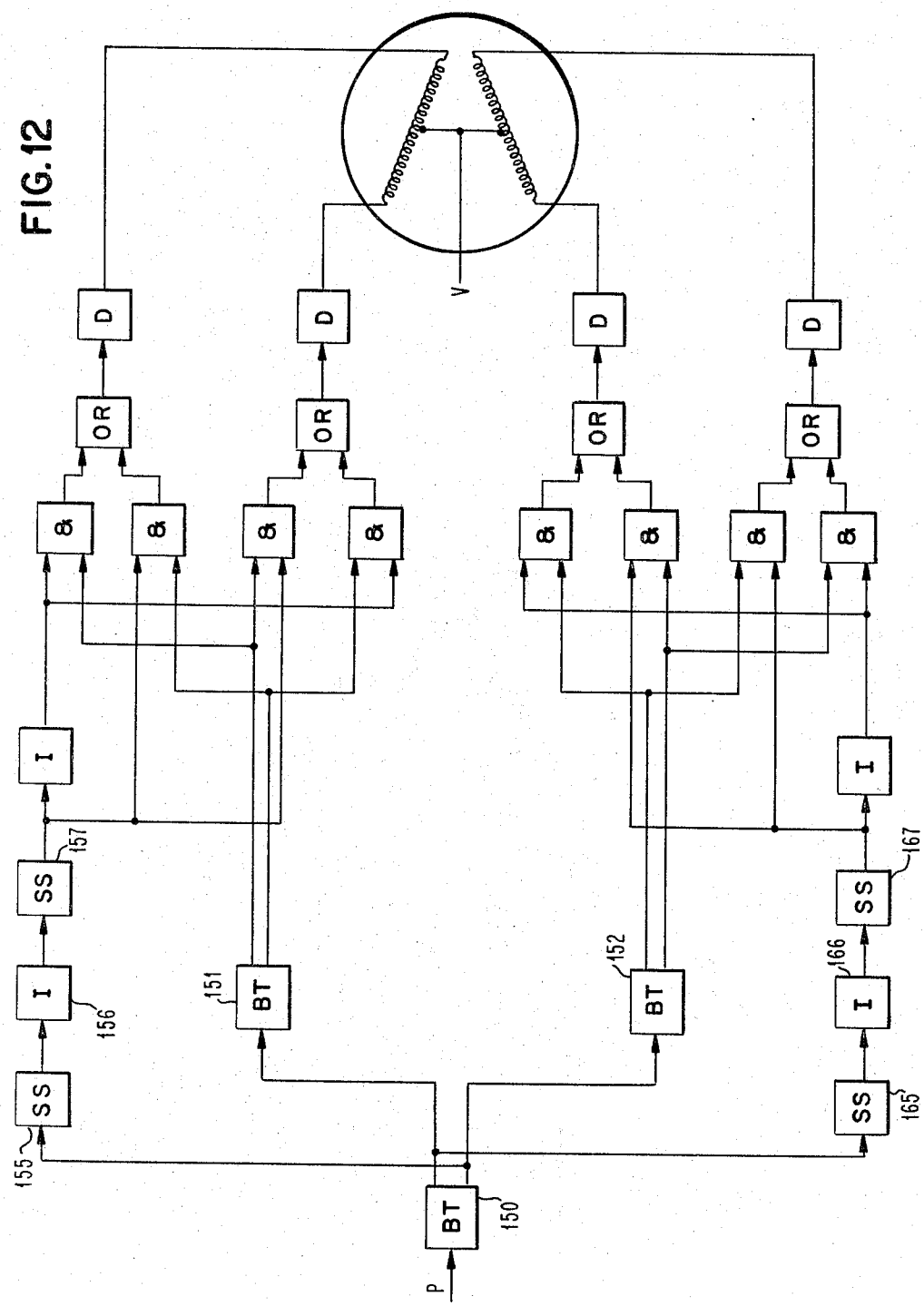

United States Patent Office 3,328,658
Patented June 27, 1967

3,328,658
SYSTEMS FOR CONTROLLING STEPPER MOTOR STARTING AND STOPPING OPERATIONS
Leon J. Thompson, La Grange, N.Y., assignor to International Business Machines Corporation, New York, N.Y., a corporation of New York
Filed July 2, 1964, Ser. No. 379,794
17 Claims. (Cl. 318—138)

The present invention relates to open-loop control systems for controlling operation of stepper motors. More particularly, the present invention relates to open-loop binary logic control systems for providing control of starting, incrementing or running, and/or stopping of stepping motors.

Stepping motors cause a predictable amount of motion, usually rotational, in response to a number of pulses introduced to driving circuits which effect the motion by causing appropriate current changes in the windings of the motor. Such motors are being usefully employed in an ever growing number of applications. For instance, a photographic type of film strip can be moved past a given point a predictable distance in response to a series of pulses applied to the driver circuits for a stepper type motor which drives a capstan with the film being moved by the periphery of the capstan. Such an arrangement is particularly useful for permitting operation upon a selected frame in the film strip such as visual observation, scanning to perform various possible operations upon or in response to the information contained in the frame, and the like. Other uses to which stepper motors have been applied include handling of various materials such as magnetic tape, cards, paper tape, paper, and the like although the present invention is not intended to be restricted to any of the aforementioned uses. The present invention is useful for any system requiring a precise movement and which is adaptable for utilization of a stepper motor type drive. The present invention is particularly well suited for use in conjunction with digital computers.

In the past, however, many problems have been encountered in attempting to implement stepper motors for drive means. One such problem is the tendency of the rotor of a stepper motor to oscillate or hunt about the final step position when it is stopped, this oscillation being predominantly a result of rotor and load inertia. For systems wherein the material being moved is to be precisely operated upon or even just to be visually observed, such oscillations all too often are intolerable and the amount of time necessary to let the oscillations damp out frequently is also intolerable.

Further, it is often difficult to reliably operate a stepper motor at relatively high speeds. That is, synchronous inductor type motors when utilized as stepper motors can be operated at a relatively high speed, but unfortunately, there is a speed well below the maximum operating speed of the motor at which stalling occurs for given loading conditions. On a graph of motor torque versus motor speed for a particular load, this shortcoming is referred to as the stall point. To be more specific, the stall point is that speed of a synchronous motor beyond which the motor will not restart with zero external load for given current and field time constants if the motor is stopped and re-energized with pulses recurring at frequencies equal to or greater than the stall frequency.

Limited extensions of the stall frequency are possible by adding resistance to the stator coil circuits thereby changing the motor time constant but this solution results in undesirable degradation of motor performance. Other possible solutions that have been suggested in the past have involved either operating the motor below the stall frequency at all times, specially designing the motor, or else increasing the speed of the pulses applied to the motor from below the stall frequency through the stall point to higher speeds, the latter approach involving manual or servo type electromechanical means. The oscillation problem has been approached in the prior art by various arrangements of mechanical damping devices and closed loop systems. However, none of the prior art solutions for stepper motor problems have satisfactorily rendered stepper motors compatible for use in conjunction with digital computer systems especially where precision positioning and/or non-oscillatory motor operation are required.

The present invention solves the foregoing problems by utilizing binary control systems for controlling the pulses introduced to the driver circuits of a stepping motor and is particularly useful for controlling a synchronous inductor motor in D.C. stepping modes. The system is a digitally controlled open loop logic arrangement for obtaining translational or rotational motion from a motor, such as rotary motion of a capstan, with high precision and repeatability. To be more specific, the present invention is a logic arrangement which operates in response to a pulse train which generally represents the motion desired from the stepper motor by the number of pulses which are in the pulse train. The logic arrangement modifies the timing of at least one of the pulses in the train and/or adds at least one pulse to the beginning or the end of the pulse train or both for controlling the timing of the pulses introduced to the driver circuits for the motor so as to realize non-oscillatory motion.

In one embodiment of the present invention, the pulse train is modified by logic circuitry for causing the pulse train which is actually applied to the motor to have initial pulses recurring at increasing repetition rates for accelerating the motor. With this embodiment, the modified train can start with initial pulses occurring at a repetition rate starting below the stall point and increasing in repetition rate to beyond the stall point so that the motor can be started and run without oscillation in a minimum amount of time and will run at a speed above the stall point.

In another embodiment of the invention, logic circuitry introduces a last pulse or pulses to the end of the pulse train with the final pusle or pulses being timed so as to put retarding torque on the rotor of the motor in such a manner that the rotor will be stopped at the desired position as the last pulse is applied for holding in that position. By this arrangement, non-oscillatory stopping of a high speed operating stepper motor can be realized.

Yet another embodiment of the present invention utilizes logic circuitry for interposing a "possicast" pulse between the next to last pulse of the train and the last pulse of the train so that dynamic braking will stop the motion of the rotor without oscillation exactly at the point of the desired step position.

Still another embodiment of the present invention utilizes logic circuitry for applying to the rotor a pulse of opposite polarity with respect to the polarity of the normal pulse train with proper timing and sufficient duration for decelerating the rotor to zero velocity at the desired step position at which time the original pulse polarity is reapplied. By this arrangement, a reverse torque is applied to the rotor by switching appropriate motor currents which in turn have been caused by appropriately timed pulses applied to the driving circuits. This embodiment is especially useful for incremental stepping and, as is the case for the embodiment discussed in the preceding paragraph, is useful for relatively low speed motor operation.

The present invention further contemplates an overall control system for a stepping motor which utilizes various possible combinations of the embodiments discussed hereinbefore. The various embodiments and combinations of the present invention are characterized by the ease with which they can be adjusted to provide non-oscillatory operation of a stepping motor at high or low speeds with the adjustments being relatively simple in nature. All embodiments are open loop and therefore readily adaptable for operation in conjunction with a computer.

Accordingly, it is a primary object of the present invention to provide open loop binary or digital control of a stepper motor.

Another object of the present invention is to provide means for starting a stepper motor and running the stepper motor at speeds above the stall point.

Another object of the persent invention is to provide non-oscillatory start up and running of a stepper motor.

Still another object of the persent invention is to provide non-oscillatory start up and running of a stepper motor at speeds beyond the stall point.

Yet another object is to provide non-oscillatory stopping at a desired step position for a stepping motor running at relatively high or low speeds.

Yet another object of the present invention is to provide non-oscillatory step incrementing of a stepper motor.

The foregoing and other objects, features and advantages of the present invention will be more apparent from the following more particular description of preferred embodiments of the invention, as illustrated in the accompanying drawings in which.

Figure 4:
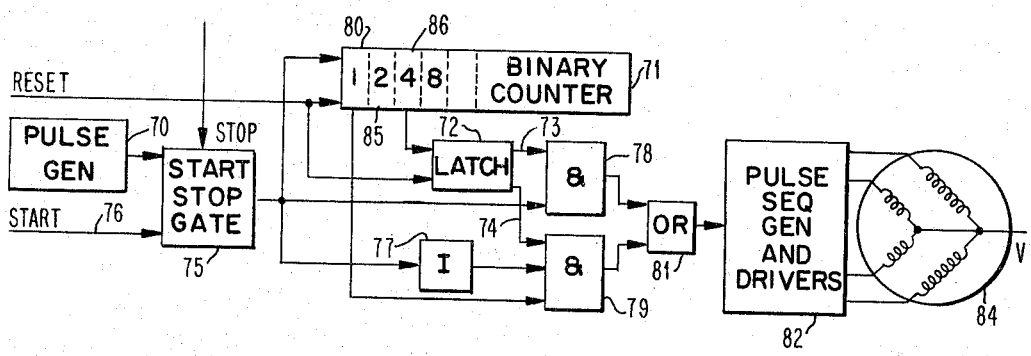
Figure 5:
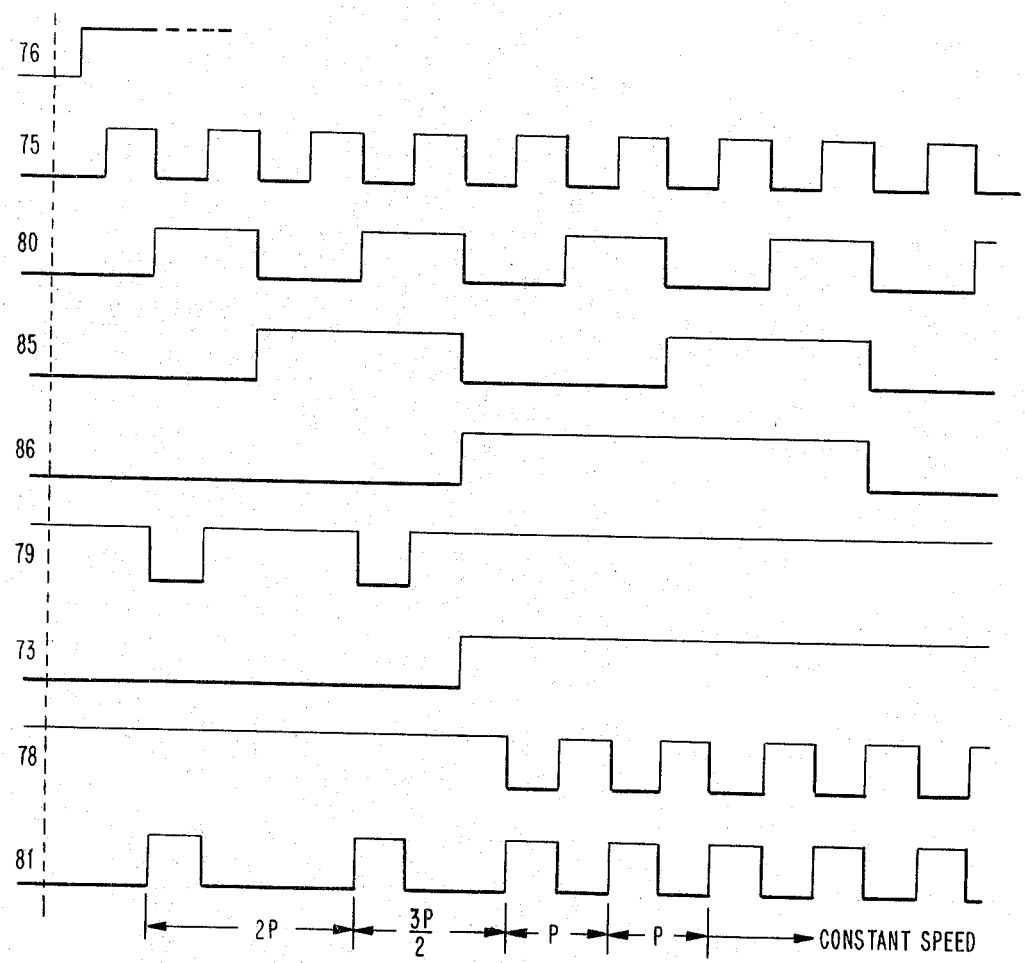
Figure 10:
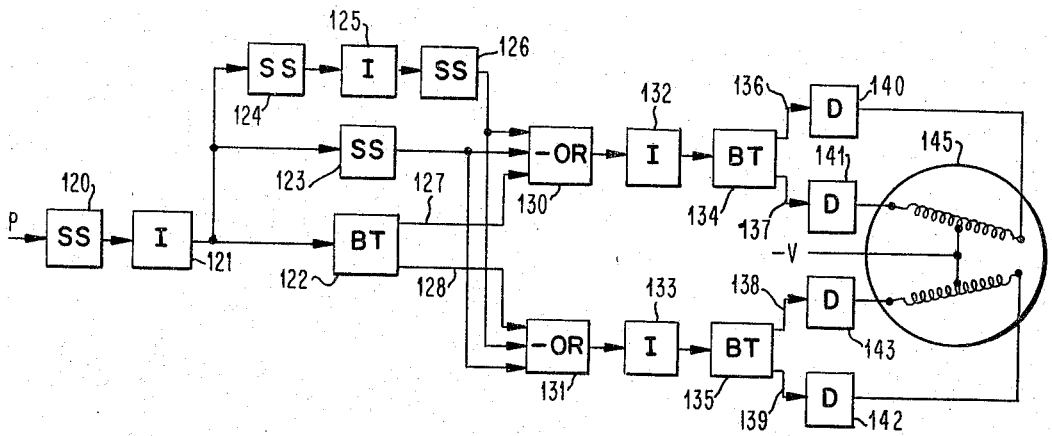
Figure 11:
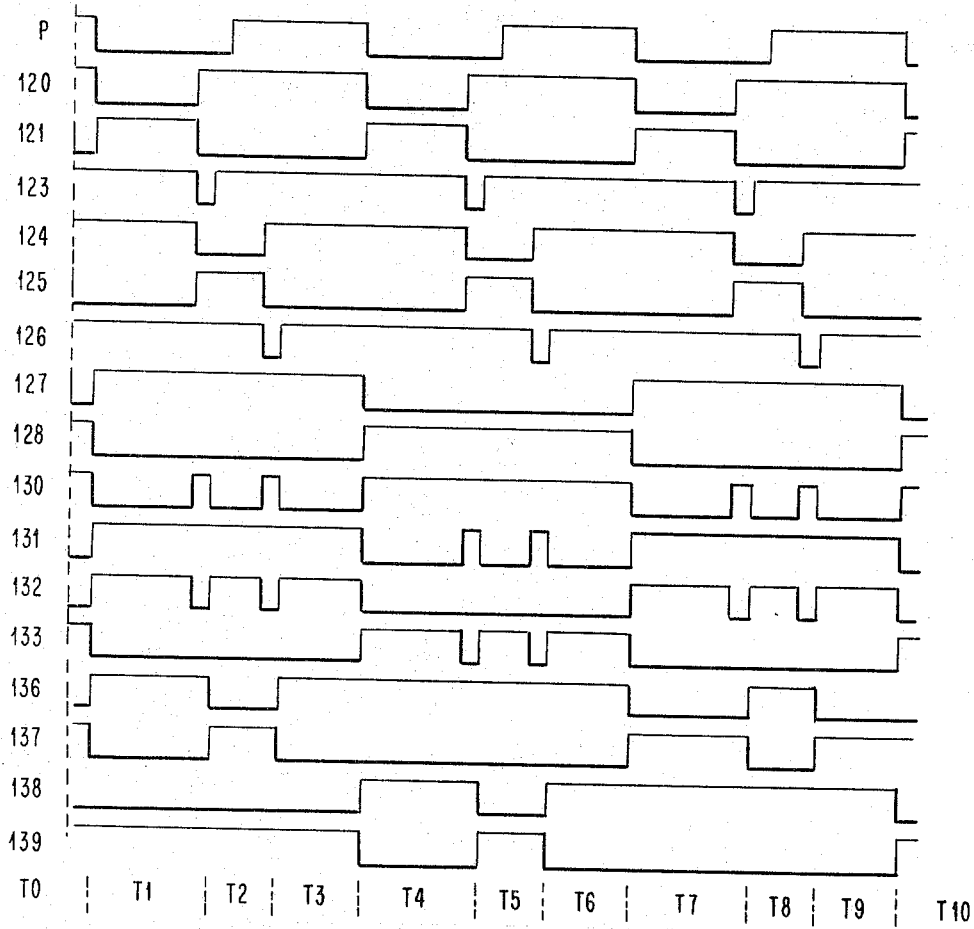

FIGURE 4 reveals a block diagram of an embodiment of the present invention for starting and running a stepper motor;

FIGURE 5 is a time base diagram of the operation of the FIGURE 4 circuitry;

FIGURE 6 illustrates a block diagram of a system in accordance with the present invention which could be utilized for stopping a stepper motor;

FIGURE 7 is a time base diagram of the operation of FIGURE 6;

FIGURE 8 shows another embodiment of the present invention for stopping a relatively low speed operating stepper motor;

FIGURE 9 is a time base diagram of the operation of FIGURE 8;

FIGURE 10 depicts an embodiment for incrementally stepping a stepper motor;

FIGURE 11 is a time base diagram of the operation of FIGURE 10; and

FIGURE 12 illustrates an embodiment of the invention capable of non-oscillatory incrementing a stepper motor having dissimilar coil windings.

Figure 1:
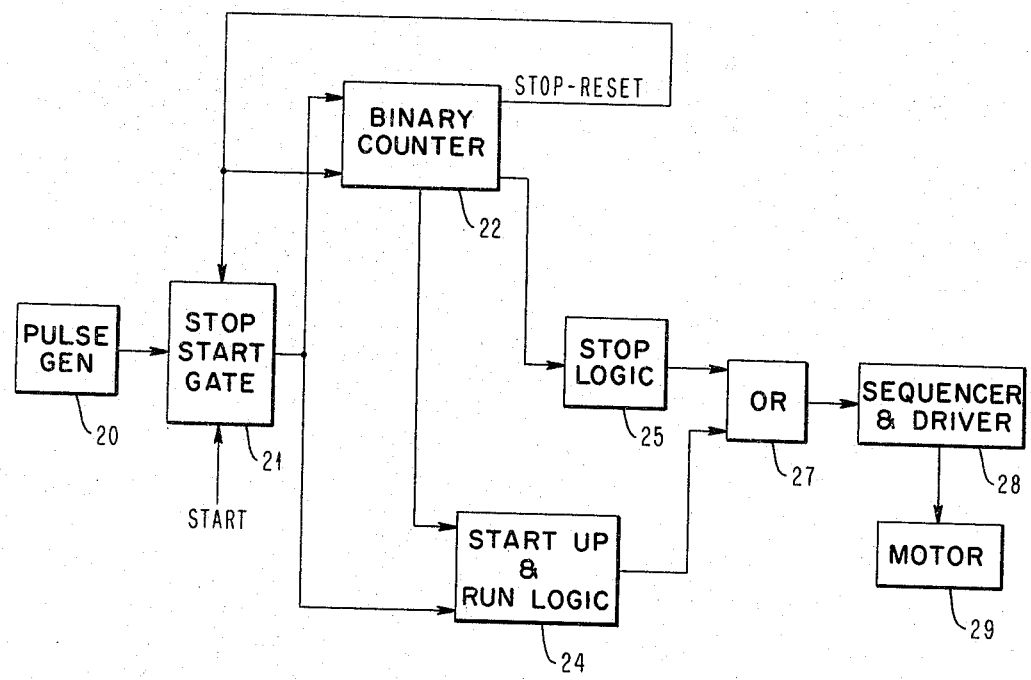
FIGURE 1 is an overall control system block diagram in accordance with the present invention which illustrates combined utilization of start and stop circuitry.

FIGURE 1 illustrates a general block diagram of an exemplary system in accordance with the present invention for overall control of a stepper motor and includes both the start up and the stop features. Pulse generator 20 is continuously producing a series of pulses which recur at a relatively constant repetition rate with each pulse potentially representing a movement of the stepper motor. When operation of the motor is to be initiated, a start signal is introduced to stop-start gate 21 which permits pulses to be introduced to binary counter 22 as well as to start up and run logic circuitry 24. Binary counter 22 would typically include a plurality of counter stages with one of the high order counting stages thereof being coupled to terminate the operation of gate 21 by introducing a stop signal thereto, and in addition, causing the binary counter itself to be reset. A relatively low order counting stage of 22 is connected to initiate operation of logic circuitry 24 while a relatively high order counter stage is connected for initiating operation of stop logic circuitry 25.

Figure 1A:
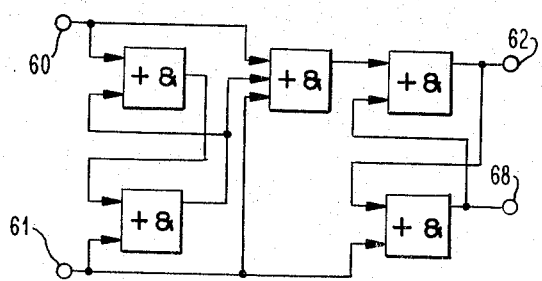
FIGURE 1A shows a typical start-stop gate or synchroniser that could be used with the present invention.

FIGURE 1A shows one of several possible start-stop synchronisers or gates which could be utilized for gate 21 of FIGURE 1 or for the other embodiments of the present invention which will be described in detail hereinafter. To insure proper operation of the control circuits of the present invention, it may frequently prove to be important that the gated pulses be precisely synchronized especially if the leading edge of the gated pulses are to define the time at which a subsequent operation occurs. The circuit shown in FIGURE 1A will, in response to a start gate signal at terminal 60, gate clock pulse signals introduced from a pulse generator to terminal 61 to the output 62 regardless of the gate signal timing. It will transmit a train of complete clock pulses beginning with the first clock pulse which rises after the signal at 60 rises and ending with the last pulse which rises before the gate signal falls.

That is, the output at terminal 62 will rise when the clock pulse input at 61 and the start gate input at 60 are both up but only if the gate input had risen first. Therefore, the output at 62 can only rise at the beginning of a clock pulse and will fall only when the clock input 61 falls thereby insuring that whole clock pulses will be gated out. Of course, no further pulses are produced after the gate is removed from 60. An inverted output would be produced at terminal 68. Initiation of operation of the FIGURE 1A circuit would be accomplished by a latch type circuit (not shown) which would raise the input to 60 in response to a start signal or trigger and which would lower the gate at 60 in response to the high ordered count mentioned before for counter 22. It is to be emphasized that the synchronizer or gate circuitry of FIGURE 1A is shown to illustrate an exemplary arrangement for performing the start-stop operation and is not claimed other than as a potential component of the control systems of this invention.

Upon being enabled by counter 22 and receiving pulses from gate 21, logic circuitry 24 of FIGURE 1 will permit an initial pulse to be introduced to OR circuit 27 which will pass this pulse to the sequencer and driver circuits 28 which, in turn, introduce stepping currents to the windings of motor 29. Logic circuitry 24 then permits no further pulses from gate 21 to continue to motor 29 for a short interval after which the pulses may be introduced at the same repetition rate as they are produced by generator 20. Alternatively, intermediate pulses can be produced from logic circuitry 24 so that the drivers for motor 29 are energized by pulses at increasing repetition rates up the rate of the pulses from pulse generator 20. By this arrangement, motor 29 is accelerated at an initial rate which is below the speed equivalent to the repetition rate of the pulses produced by generator 20 but ultimately runs at a speed equivalent to the pulses produced by generator 20. After motor 29 has reached the desired synchronous speed, circuitry 24 has completed its job and will simply pass the pulses from generator 20 directly to OR 27. A better understanding of this feature of the invention will be obtained from the more detailed discussion of FIGURES 4 and 5 hereinafter.

Stop logic circuitry 25 is actuated by a relatively high order counting stage of counter 22 which stage could be of the same or lower order than the counting stage which introduced the stop signal to gate 21. The purpose of circuitry 25 is to introduce pulses appropriately timed at the end of the pulse train which has been generated by turning gate 21 on and off so that the rotor of motor 29 will have acquired substantially zero rotational velocity when it has reached the physical orientation equivalent to the desired step position. Several possible arrangements for implementing the circuitry for logic 25 will be discussed hereinafter in conjunction with the description for FIGURES 6 through 12.

FIGURE 2 shows a somewhat oversimplified but symbolic representation of a typical motor configuration which could be controlled by the circuitry of the present invention. It should be understood at the outset that the motor illustrated in FIGURE 2 as well as the driver control and sequencer arrangement of FIGURE 3 are shown here for exemplary purposes only in order to provide a more complete understanding of the present invention and could be replaced by a variety of motors and circuits which are well known to those having normal skill in the art.

Figure 2A:
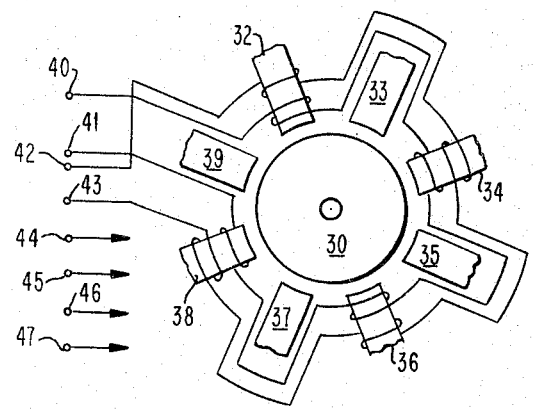
FIGURE 2A is a somewhat crude but symbolic illustration of a typical stepper motor which can be utilized with the present invention with a particular showing of connections for one set of bifilar windings.

The motor illustrated in FIGURE 2A is a permanent magnet rotor, synchronous inductor type motor which is characterized by a salient pole toothed rotor incorporating a permanent magnet and a salient pole toothed stator on which stationary coils are wound. One motor actually used in conjunction with the present invention had a rotor 30 with a 50 tooth pitch while the poles 32 through 39 which were on the stator had teeth machined into the faces thereof for a tooth pitch of 48. The stator poles of the motor have bifilar windings thereon which are illustrated for poles 32, 34, 36 and 38 only, it being understood that similar windings are on poles 33, 35, 37 and 39. To be more specific, a voltage introduced at terminals 40 and 41 will pass through the innermost coils of poles 32, 34, 36 and 38 which are wound in such a manner that alternate poles of the series will be north and south. That is, a signal introduced into terminals 40 and 41 could render poles 32 and 36 to appear as north poles to rotor 30 while poles 34 and 38 would appear as south poles or vice versa.

Terminals 42 and 43 are connected to another series of interconnected coils wound on the same poles as those connected to terminals 40 and 41. However, it can be seen from the symbolic representation of FIGURE 2A that the coils connected to terminals 42 and 43 are wound to cause the poles to have an opposite magnetic character than the coils connected to terminals 40 and 41. Thus if a signal were first introduced at terminals 40 and 41 so that pole 32 appeared as a north pole and was then removed and introduced to terminals 42 and 43 with like polarity, pole 32 would appear as a south pole to rotor 30. In actuality, the two sets of coils on each pole are wound together but energized at opposite ends. The advantage of this arrangement is that unidirectional current conducting means such as transistors can be employed for energizing the coils directly without need for switching. Such coil arrangements are referred to as "bifilar" windings. The motor as illustrated is considered a two phase motor since the coils connected to terminals 40 through 43 are referred to as the first phase while similar coil connections which would be connected to terminals 44, 45, 46 and 47 with respect to poles 33, 35, 37 and 39 would be referred to as the second phase.

Figure 2B:
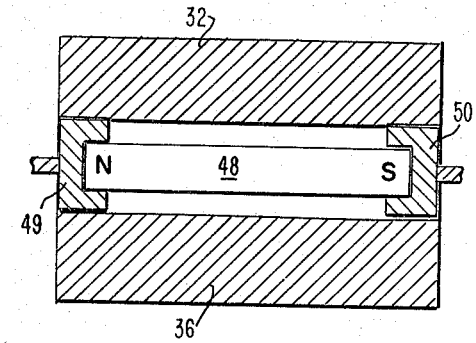
FIGURE 2B is a cross section of the stator and rotor of the motor shown in FIGURE 2A.

The motor illustrated in FIGURE 2A is shown in a sectioned view in FIGURE 2B in which it can be seen that the rotor is composed of a permanent magnet 48 which has caps 49 and 50 mounted on the ends thereof. The rotor teeth are formed in caps 49 and 50 with exactly the same number of teeth each but with the mounting of the caps on magnet 48 being such that there is an axial skew of the teeth on one cap with respect to the other. Thus for any given combination of energized coils on the stator, rotor 30 will assume one stable position. If for instance terminals 41, 43, 45 and 47 of FIGURE 2A were grounded and a signal were introduced to terminals 40 and 44, rotor 30 would assume one position. By de-energizing terminal 40 and energizing terminal 42, the effective magnetic circuits around the stator would be shifted and cause rotor 30 to move into a new stable position. By continued manipulation of the energization signals introduced to the coils of the stator, the magnetic field can be caused to effectively cycle one time around the stator which will have the effect of moving the rotor by one tooth pitch. As shown in FIGURE 2B, cap 49 would effectively be a north pole throughout its entirety while cap 50 would effectively be a south pole throughout its entirety.

Figure 3B:
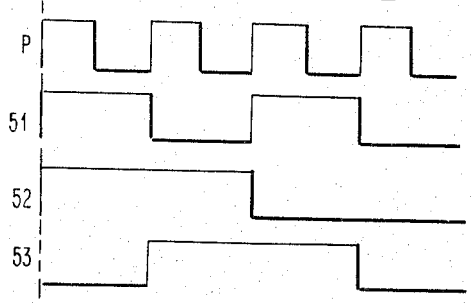
FIGURE 3B is a time base diagram of the operation of the blocks in FIGURE 3A.
Figure 3A:
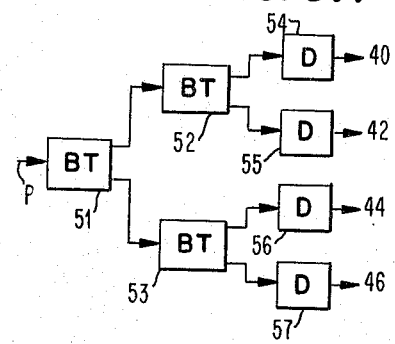
FIGURE 3A is a typical driver energization block diagram which could be utilized with a motor such as is shown in FIGURE 2.

FIGURE 3 shows a simple sequencer and driver arrangement for controlling the operation of a motor such as was illustrated in FIGURE 2. A series of regularly recurring pulses P are introduced to binary trigger 51 which causes changes from one conduction state to the other in trigger 51 in response to the rise of each pulse in train P for example. In turn, binary triggers 52 and 53 are each sensitive to change their conduction state in response to rises in the respective conduction states of trigger 51. Subsequently, drivers 54 through 57 which could be connected as noted to terminals for the motor of FIGURE 2A are sensitive to the conduction states of triggers 52 and 53. Therefore, it can be seen from FIGURE 3B that for each pour pulses in train P, the drivers will have gone through one complete cycle of combinations and returned to their original conducting state thus causing rotor 30 of the motor in FIGURE 2A to move one tooth pitch. It is again emphasized that the motor illustrated in FIGURE 2 and the sequencer and driver arrangement shown in FIGURE 3 are here illustrated for exemplary purposes only and are not claimed as part of the present invention apart from the control circuitry.

The time base diagrams used herein to aid in describing the circuit operation generally indicate output levels for the blocks or lines having the same reference numbers as are listed along the left margins of the diagrams.

A more detailed block diagram of a preferred embodiment is presented in FIGURE 4 with the time base diagram for the FIGURE 4 circuitry being presented in FIGURE 5. Initially, a reset signal has been introduced to binary counter 71 to clear all of the counter stages thereof and additionally has been introduced to deactivate latch 72 which has the effect of lowering the potential on line 73 and raising the potential on line 74. Pulse generator 70 produces a continuous train of regularly spaced pulses which are introduced to gate 75, but do not pass therethrough until a start signal has been introduced at line 76. When line 76 is energized, the pulses from generator 70 will appear at the output of gate 75 and be introduced to binary counter 71, inverter 77 and AND circuit 78. The initial pulse passed by gate 75 does not get through to the motor 84 since line 73 is down thereby deconditioning AND 78. However, as can be seen from the time base diagram of FIGURE 5, the fall of the initial pulse from gate 75 causes the first stage of the binary counter, stage 80, to raise which conditions AND circuit 79 which in turn has been conditioned by line 74 being up. Accordingly, the inverted pulse from 75 appears at the output of 77 and causes a pulse to be produced by AND circuit 79 which in turn passes through OR circuit 81 to energize pulse sequencer generator and driver circuits 82 and finally, motor 84. Thus the first pulse from OR circuit 81 (as seen in FIGURE 5) is introduced to the motor.

Upon the occurrence of the next output pulse from 75, stage 80 will be de-energized and stage 85 will be energized which blocks passage of the next inverted pulse through AND 79. However, the third pulse re-energizes stage 80 which reconditions AND 79 and therefore permits the second energizing pulse to be produced at the output of OR circuit 81. It should be noted by the timing involved that a period equivalent to twice the period of the pulses generated by pulse generator 70 has now passed. The occurrence of the fourth pulse from gate 75 will be sensed by counter stage 86 which will set latch 72 thereby deconditioning AND 79 and conditioning AND 78. This permits the next pulse from gate 75 to pass through AND 78 to OR 81 and will occur at a time period of three halves, the time period of the pulses from generator 70. Subsequently, latch 72 stays set conditioning AND 78 and deconditioning AND 79 so that the pulses from gate 75 continuously stream through OR 81 into the motor sequencer and driving system. This arrangement makes it possible to accelerate a stepping motor to the desired speed (which corresponds to the time period of the pulses produced by generator 70) without incurring any synchronous oscillation once synchronous speed is attained. In addition, it is possible to utilize the motor 84 at a synchronous speed (corresponding to P) which is above the stall frequency for the motor by simply adjusting the time period between the first two pulses from OR 81 so that the repetition rate therebetween is below the stall frequency repetition rate.

It should be appreciated that there are a variety of arrangements for accomplishing the same result within the spirit of the invention shown and described in the FIGURE 4 embodiment. For instance, if a relatively large load is coupled to the motor but will not accelerate satisfactorily with the two pulse accelerating arrangement shown in FIGURE 4, the accelerating pulse period supplied to the motor may be lengthened and the number of pulses and pulse periods before operating speed is reached can be increased to provide smooth accelerating to synchronous speed. This can be accomplished by a variety of means such as by adding additional channels similar to that involved in AND circuit 79 or by using gated single shot circuits or gated AND circuit combinations or the like.

It is apparent that the overall operation of FIGURE 4 can be described as a binary controlled variable frequency pulse generator which has the ability to produce non-linear acceleration of the motor and its load up to synchronous speed. Therefore other variable frequency generator techniques such as variable voltage control multivibrators, sequenced time delays and the like with appropriate gating arrangements are some of the possible alternatives to the arrangement shown in FIGURE 4. It should be further appreciated that the pulse sequencer generator and drivers 82 could correlate directly with the circuitry illustrated in FIGURE 3 and the motor 84 which is actually driven could be correlated directly with the motor described and illustrated in FIGURE 2.

One embodiment of the present invention for stopping a stepping motor without oscillation after a predetermined number of steps have been taken is illustrated in FIGURE 6. In this embodiment, pulses at a regular repetition rate from an oscillator or pulse generator have been passed through start stop gate or synchronizer 90 to be counted by binary counter 91 and also have been passed through OR circuit 92 into the pulse sequence generator and driver circuit 94 for energizing the coils of motor 95. After sufficient pulses have been counted by binary counter 91, a pulse is produced at the output thereof which deactivates gate 90 and initiates operation of single shot circuit 96. In the exemplary arrangement shown in FIGURE 6, binary counter 91 is arranged to deactivate gate 90 two pulses before the last step position which is desired. If the last pulse to be applied to the motor were the last pulse shown for gate 90 in the time base diagram of FIGURE 7, the rotor of motor 95 by virtue of the inertia involved would at best oscillate violently about the final desired step position and could conceivably even continue to the next stable step position which would be a highly undesirable situation. However, by utilizing the circuitry of FIGURE 6 to produce the last two pulses of the train necessary to step the motor, the motor can be stopped at the desired position with no oscillation.

To be more specific, the dropping of the output of binary counter 91 will energize single shot circuit 96 so that it will produce a single pulse output which is variable in width, this being noted by the double headed arrow for 96 in the time base diagram of FIGURE 7. The end of the pulse from single shot 96 actuates both single shot 97 and single shot 98. The output from single shot 97 is directly connected to OR circuit 92 for energizing the coils of the motor with a pulse which is delayed with respect to the repetition rate of the preceding pulse train. Thus the pulse produced by 97 will cause deceleration of the rotor of motor 95. After a length of time required for the pulse to drop at the output of single shot 98 (which is also adjustable as is indicated by yet another double headed arrow), single shot 99 is energized to introduce the last step pulse to OR circuit 92, thence to motor 95. The last pulse so introduced by 99 corresponds to the desired step position. Thus by merely observing the operation of the rotor of motor 95 on an oscilloscope, single shot circuits 96 and 98 can be adjusted in width so that a decelerating pulse will be applied by single shot 97 sufficient to cause zero velocity of the rotor exactly as it reached the desired step position at which time single shot 99 will introduce the last pulse to the motor in exactly the desired position without oscillation. Thus if 100 pulses were to correspond to a predetermined stepping operation, and the arrangement of FIGURE 6 were to be utilized, counter 91 would count up to 98 pulses at which time it would deactivate gate 90. Thereatfer, single shot circuits 96 and 97 would produce the 99th pulse and single shots 98 and 99 in conjunction with single shot 96 would produce the 100th or last pulse.

It should be appreciated that the circuitry shown in FIGURE 6 could be operational with a single pair of single shots such as 96 and 97 if the motor oscillation is sufficiently small upon stopping to permit such an arrangement and that a motor with a larger amount of inertia may require additional stages of delayed pulses. However, such modifications are well within the skill of one in the art within the spirit of the teachings of the present invention. Thus the motor can be stopped from a relatively high speed operation in the shortest possible time without oscillation and can be adjusted for maximum operation in a relatively simple manner.

It should be further noted that the circuitry of FIGURE 6 is particularly well adapted for combining with the circuitry shown in FIGURE 4 to give substantially overall control of a high speed operating stepper motor. In fact, various portions of the two systems could be substantially identical. Furthermore, the operations of the single shot circuit in the FIGURE 6 embodiment and the operations as illustrated in FIGURE 4 as well as those of FIGURES 8, 10 and 12 could all be implemented by utilizing multi-conditioned AND circuits and clocks or counters.

FIGURE 8 reveals yet another embodiment of the present invention for stopping a stepping motor at the end of an incrementing operation. As in the other arrangements, pulse generator 100 has been producing pulses at a regular repetition rate which, under normal operating circumstances, are being passed through gate 101 to be counted by pulse counter 102.

Additionally, the pulses from gate 101 energize pulse sequence generator circuit 104 which in turn switch on and off various combinations of driver circuits 108 to 111. As a counter stage or stages of a relatively high order in counter 102 is energized, single shot circuit 105 is activated. In the time base diagram of FIGURE 9, it can be seen that the occurrence of the next to last pulse before the desired step position is effective by means of counter 102 to initiate operation of single shot circuit 105.

When the output pulse from single shot 105 drops, single shot 106 will be activated introducing a pulse simultaneously to all driver stages 108, 109, 110 and 111 which, since these drivers are operating into bifilar winding arrangements illustrated in FIGURE 2, results in opposing magnetic forces as between each pair of coils wound on any given pole thereby placing the coils effectively at ground as seen by the rotor of the motor. Thus the permanent magnetic rotor of motor 114 which had been driven as a motor is suddenly acting as a generator with respect to the field coils and will have a retarding or decelerating torque applied thereto. While single shot 106 is energizing the driver circuits, the pulse sequence generator 104, which has not been effected in any way by the operation of single shots 105 and 106, has sensed the last pulse from gate 101 and is attempting to energize the drivers in accordance therewith. At this point in time, counter 102 is full and introduces a signal into gate 101 to stop the operation thereof. Thus the pulse sequence generator effectively stores the last pulse from gate 101 for appropriately energizing the combination of drivers equivalent to the last step position after the pulse from single shot 106 has dropped.

By observing the motor operation on an oscilloscope, single shot circuits 105 and 106 can be adjusted so that the generator action maintained hereinbefore will cause the rotor of motor 114 to decelerate to substantially zero velocity as it reaches the last step position at which point sequencer 104 is again effective so that the rotor is locked in the desired step position without oscillation. By making the pulse width from single shots 105 and 106 adjustable, the best range of control can be realized for facilitating the oscilloscope alignment procedure but either of these pulses widths could be fixed depending upon the circumstances.

It can be seen that this embodiment is an advantageous improvement over the prior art method of stopping a rotor by causing the coils thereof to be shorted and act as a generator. Such operation, known as dynamic braking, has been performed in the prior art by manual or by analog servo (closed loop systems which are not compatible with digital operation. It should be understood that energization of all drivers 108–111 causes the coils of all of the stator windings to be effectively shorted together through a low impedence thus providing dynamic braking action in the manner of a permanent magnet excited generator since the opposing energization of the bifilar coils produces a net torque of zero on the rotor. As compared to the stopping circuitry of FIGURE 6, the FIGURE 8 circuitry is particularly useful for relatively slow speed stepping motor operation such as under circumstances where the maximum uncontrolled or undamped oscillation is less than one motor step.

FIGURE 10 shows a system for operating a synchronous inductor motor similar to that shown in FIGURE 2 in an incremental stepping mode to produce non-oscillating intermittent motion. The system can step the motor one step at a time or can produce a series of discrete steps in operating the motor. The particular system shown in FIGURE 10 provides the stepping motion of the motor by applying an initial accelerating pulse, then applying a momentary reverse or decelerating pulse and finally reapplying the forward pulse at the exact time that the motor arrived at the step position and does this in such a manner that the motor can be stopped momentarily, at least, at the step position corresponding to each input pulse without oscillation. Further, each incremental step is essentially independent of previous and subsequent operation history. It is only necessary that the next subsequent operation does not occur until after the timing of events for the immediately occurring increment have been permitted to complete a stepping cycle. The following description of the FIGURE 10 circuitry will be referenced to the time base diagram of FIGURE 11 to facilitate an understanding of the operation. Arbitrary levels have been assumed for the components at time T0. The inverter circuits of FIGURE 10 such as 121, 122, 125, 132 and 133 are shown only because the diagram illustrates a circuit actually designed to accommodate single shot circuits which produce timed negative pulses in response to negative input gates or triggers. Single shots producing positive pulses from negative input pulses would eliminate the need for the inverters.

A negative input pulse P which is introduced to single shot circuit 120 initiates operation of the system. The output pulse produced by 120 is inverted through inverter 121 and thence introduced to binary trigger 122 and a pair of delay circuits including single pulse circuits 123 and 124. The beginning of the pulse from single shot 120 and inverter 121 will cause binary trigger 122 to change conduction state thus raising the level of line 127 and dropping the level of 128 which is passed through negative OR or NOR circuit 130 and inverter 132 to cause binary trigger 134 to change its conduction state thus raising line 136 and lowering line 137. This causes driver 140 to turn off and driver 141 to turn on and marks the start of time period T1. When the pulse at the output of inverter 121 drops, single pulse circuit 123 will produce a pulse which is then introduced to one input of NOR circuits 130 and 131. Since line 127 is now up and line 128 is down, the pulse from single shot circuit 123 is passed through NOR 130 but cannot pass through NOR 131. Thus the pulse from 123 is passed through NOR 130 and inverter 132 to cause binary trigger 134 to reverse its conduction stage dropping line 136 and raising line 137. This has the effect of turning driver circuit 140 on and turning driver circuit 141 off and marks the end of time period T1 and the start of T2.

The trailing edge of the output pulse from inverter 121 not only had initiated operation of single shot 123 but additionally initiated operation of single pulse circuit 124. The output pulse from 124, after passing through inverter 125, initiated operation of single shot circuit 126. NOR 130 being capable of passing the output from 126, causes the output pulse from 126 to be introduced to binary trigger 134 signaling the end of time T2 and again changing the conduction state of 134 raising line 136 and lowering line 137. Thus, during time T1, an accelerating pulse was applied to the rotor of the motor causing it to begin motion. During time T2, reverse torque was applied to the motor causing it to decelerate or slow down as it approached the desired step position. As time T3 commenced, the rotor was substantially in the desired step position and was locked in by the return to the coil energization line levels which caused the initial acceleration. Thus at time T3 the rotor is in a stable non-oscillating incrementing position.

Upon introduction of the second negative pulse P, which marks the beginning of period T4, binary trigger 122 will be caused to change conduction state thereby lowering the level of line 127 and raising 128. This has the effect of preventing any further negative signals from being passed through NOR circuit 130 but of permitting NOR circuit 131 to pass any subsequent pulses. In addition, the binary trigger 135 senses the change in conduction state and changes its own conduction state thus raising line 138 and lowering line 139 causing driver 143 to conduct and turning off driver 142. For time period T4, T5 and T6, the operation of the circuitry including elements 131, 133, 135, 142 and 143 is substantially the same as the operation of the elements connected to NOR 130 as described hereinbefore.

The third negative transition in the pulse train P causes the beginning of time period T7 which is operationally the same as was described for time periods T1, T2, and T3 except that the line levels out of drivers 140 and 141 (i.e., as controlled by line levels 136 and 137) are reversed. This third cycle continues for time period T7, T8 and T9. It should be noted that stable step positions are realized during times T3, T6 and T9 and would be realized in time T12 at which point a complete cycle would have been completed. In addition, times T3, T6, T9 and T12 correspond directly to each pulse introduced to the system.

The following is a table of what has just been described for the operation of FIGURE 10 and indicates the type of torque which is being applied to the rotor of motor 145 for each of the given periods. Note that the table shows a complete stepping cycle for the motor.

| Time | Step | Rotor Torque | Drivers | | | |
|---|---|---|---|---|---|---|
| | | | 140 | 141 | 142 | 143 |
| T0 | 0 | Hold | On | Off | On | Off |
| T1 | | Fwd. | Off | On | On | Off |
| T2 | | Rev. | On | Off | On | Off |
| T3 | 1 | Hold | Off | On | Off | Off |
| T4 | | Fwd. | Off | On | Off | On |
| T5 | | Rev. | Off | On | On | Off |
| T6 | 2 | Hold | Off | On | Off | On |
| T7 | | Fwd. | On | Off | Off | On |
| T8 | | Rev. | Off | On | Off | On |
| T9 | 3 | Hold | On | Off | Off | On |
| T10 | | Fwd. | On | Off | On | Off |
| T11 | | Rev. | On | Off | Off | On |
| T12 | 4 | Hold | On | Off | On | Off |

The adjustment of single shot circuits 120, 123 and/or 124 while observing the reaction of the motor on an oscillagraph display renders the circuitry of FIGURE 10 easily adaptable to set the proper timing for non-oscillatory step incrementing of the motor 145. It should be understood that input pulses P could be random or cyclicly repetitive depending on the desired application up to a maximum pulse rate determined by the time required for the completion of the timing sequence discussed hereinbefore. These timing sequences for a particular system are a function of the parameters involved including system inertia, friction, motor current and power, loading and so forth.

It should be noted that the circuitry shown in FIGURE 10 is arranged so that the reaction of the timing circuitry and the logic control is relatively independent of the particular set of coils that are being switched. That is, the timing of the output pulses from single shot circuits 123 and 126 is the same regardless of whether the stator coils connected to drivers 140 and 141 or those connected to drivers 142 and 143 are being switched. In practical applications, coil circuit parameters are rarely identical and occasionally the differences could be sufficiently significant to cause minor amounts of oscillation when reaching the step incrementing position for a particular coil or coils.

If the oscillations from lack of coil circuit uniformity cannot be tolerated, a system similar to that shown in FIGURE 12 can be utilized. If the stepping motor that is being controlled employs bifilar windings, there would be uniformity in the magnetic circuits relative to each individual stator pole. However, even in bifilar wound motors, there are a variety of other factors that could cause a lack of uniformity in motor circuitry such as a missing turn or turns on one or more coils or variations in wire resistance within each winding or differences in the characteristics of the magnetic circuits or the like. If the non-uniformities are not a significant factor, the system shown in FIGURE 10 will be sufficient. Otherwise, the system such as is shown in FIGURE 12 should be utilized. Inasmuch as the general operation of the circuitry shown in FIGURE 12 is substantially the same as that described in FIGURE 10 except for the inclusion of two different timing circuits for each set of bifilar windings, the description of this figure will be omitted. Suffice it to say that the operation of the motor can be observed on an oscillograph while the single shot circuits 155, 157, 165 and/or 167 which are actuated by first binary trigger 150 are adjusted to take out any oscillation at each step increment.

There are a variety of possible arrangements which will be apparent to those having normal skill in the art in the light of the present invention for performing the requisite timing operations for controlling a stepper motor in the spirit of the various embodiments shown and described and could include the use of combinations or arrangements of counters to achieve the timing attained by the single shot circuits or various combinations of clocks, counters, AND circuits, OR circuits, latches and the like. The individual or combined control systems which have been shown and described hereinbefore are considerably less expensive to construct than other control systems for operating stepping motors. Furthermore, the control systems shown and discussed hereinbefore have a significant advantage in that they lend themselves to computer controlled applications since they are digital in nature and open loop in operation.

Operation of a stepper motor controlled by the present invention can be caused to reverse (i.e., rotate in an opposite dircetion) in a relatively simple manner. For instance, referring to FIGURE 3A, the output lines from binary trigger 52 could be switched to control drivers 56 and 57 while the output lines of binary trigger 53 could be switched to control drivers 54 and 55 which is an operation that could be performed quite easily by a relay or simple switching arrangement thus providing rotation of the stepper motor in either direction. Another arrangement which could be advantageously utilized to perform the rotation reversing function is to place a double pole, double throw type switch in the output lines of binary trigger 51 in FIGURE 3A for appropriately connecting the outputs of binary trigger 51 to binary triggers 52 and 53 depending upon the desired direction of rotation. The switching action would preferably be accomplished by logical AND and OR networks for high speed operation. Although the stepper motor described in conjunction with this invention is a two phase type motor, it should be apparent that the invention is not restricted to such an operation but can be utilized to control any multiphased motor. Also, NOR logic has been used throughout the description.

While the invention has been particularly shown and described with reference to several preferred embodiments thereof, it will be understood by those skilled in the art that other variations and changes in form and details in addition to those discussed hereinbefore may be made therein without departing from the spirit and scope of the invention.

What is claimed is:

1. A logical system for controlling the operation of a stepping motor comprising means for producing a train of spaced pulses occurring at a regular repetition rate,
   means for selectably actuating said pulse train producing means,
   logic means responsive to signals from said pulse train producing means for modifying the said pulse train to include therein at least one pulse occurring irregularly with respect to the pulses of said train,
   means for deactivating said pulse train producing means subsequent to a predetermined number of pulses therefrom, and
   driving means responsive to the said modified pulse train for energizing said stepping motor in accordance therewith,
   said logic means being constructed and arranged for timing the pulses of said modified train for producing relatively non-oscillating stepping motion by said motor.

2. A system in accordance with claim 1 wherein said logic means includes circuitry for modifying the said pulse train so that at least the initial pulse occurs at a lower repetition rate than the repetition rate of said train for providing relatively non-oscillatory starting of said motor.

3. A system in accordance with claim 1 wherein said logic means includes circuitry for modifying the said pulse train so that at least the last pulse of said train occurs at a lower repetition rate than the said train for providing relatively non-oscillatory stopping of said motor.

4. A system in accordance with claim 1 wherein said logic means includes circuitry for applying and removing energization signals to all coils of said motor immediately prior to energization of said motor by the last pulse of said train for providing dynamic braking.

5. A logical system for controlling the operation of a stepping motor comprising
   means for producing a train of spaced pulses at a regular repetition rate, means for selectably actuating said pulse train producing means, binary counter means responsive to the output of said pulse train producing means and having a high order count thereof coupled for deactivating said pulse train producing means, driving means connected for energizing said stepping motor, start logic means responsive to at least one of the low order counts of said binary counter means for interruptably coupling pulses of said train to said driving means at initial repetition rates increasing up to the repetition rate of said train and at the repetition rate of said train thereafter, and stop logic means responsive to at least one of the high order counts of said binary counter means for producing pulses timed to apply retarding torque to the rotor of said motor, said driving means being constructed and arranged for coupling the output pulses of said stop logic means to said motor, whereby said stepping motor can be started, run and stopped without substantial oscillation.

6. A system in accordance with claim 5 wherein said stop logic means includes circuitry for energizing all stator coils of said motor immediately prior to application of the last pulse of said train to said driving means for providing dynamic braking of said motor.

7. A system in accordance with claim 5 wherein said stop logic means includes circuitry for producing a plurality of terminal pulses occurring at decreasing repetition rates with respect to the repetition rate of said train, at least the next to last pulse produced by said circuitry being timed for applying decelerating torque to the rotor while the last pulse so produced being timed for application to said motor when the rotor has substantially reached the desired step position.

8. A logic system for starting a stepping motor comprising means for producing a train of spaced pulses at a regular repetition rate, means for selectably activating said pulse train producing means, driving means connected for energizing said stepping motor, a plurality of logic gate circuits responsive to pulses from said pulse producing means for introducing pulses to said driving means at successively increasing repetition rates up to the said regular repetition rate, and means responsive to at least one of said gate circuits for introducing to said driving means the pulses of said train upon attainment of said regular repetition rate by said gate circuits.

9. A logic system for starting a stepping motor comprising means for producing a train of spaced pulses at a regular repetition rate, means for selectably activating said pulse train producing means, binary counter means including a plurality of successively ordered counter stages arranged for counting the pulses from said pulse producing means, driving means connected for energizing said stepping motor, a plurality of logic circuits including at least a first and a last logic circuit, said first logic circuit being responsive to actuation of a low ordered said counter stage for introducing an initial pulse to said driving means, said last logic circuit being responsive to said pulse train and to a higher ordered said counter stage relative to said first logic circuit for introducing pulses to said driving means subsequent to said initial pulse at a repetition rate increasing up to said regular repetition rate and at said regular repetition rate thereafter, the pulses produced by said logic circuits being timed for substantially non-oscillatory acceleration of the rotor of said motor up to and at the speed corresponding to said regular repetition rate.

10. A logic system for starting a stepping motor comprising means for producing a train of spaced pulses at a regular repetition rate, means for selectably actuating said pulse train producing means, binary counter means including a plurality of successively ordered counter stages arranged for counting the pulses from said pulse producing means, driving means connected for energizing said stepping motor, a latch circuit, means for resetting said binary counter means and said latch circuit prior to actuation of said pulse train producing means, first and second AND circuits, and an inverter circuit coupled for receiving said pulse train, said first AND circuit being conditioned by the reset state of said latch circuit and actuation of a low ordered stage of said binary counter for coupling predetermined initial output pulses from said inverter circuit to said driving means at a repetion rate below that of said pulse train, said latch circuit being set in response to actuation of a high ordered stage of said binary counter relative to said low ordered stage for conditioning said second AND circuit and deconditioning said first AND circuit, said second AND circuit being responsive to the set of said latch circuit for coupling said pulse train to said driving means, the repetition rate between the initial pulse so coupled and the last pulse coupled by said first AND circuit being intermediate the repetition rate of said pulse train and the rate of the pulses coupled by said first AND circuit immediately prior thereto.

11. A logic system for stopping a stepping motor comprising means for producing a train of spaced pulses at a regular repetition rate, binary counter means including a plurality of successively ordered counter stages arranged for counting the pulses from said pulse producing means with the output of a high ordered counter stage being coupled to said pulse producing means for terminating the pulse train produced thereby, a plurality of driver circuits connected for energizing said stepping motor, means for sequentially actuating said driver circuits in response to the pulse train for stepping said motor, and logic means responsive to one of said counter stages of a lower order with respect to the aforesaid high ordered counter stage for simultaneously applying an energizing pulse to all of said driver circuits for providing dynamic braking of the rotor of said motor immediately prior to introduction to said driver circuits of the last pulse of said train from said sequential actuating means, whereby said motor will stop in a substantially non-oscillatory manner at the stepping position corresponding to the last pulse of said train.

12. A stepping motor stopping system in accordance with claim 11 wherein said logic means includes first and second pulse circuits, said first circuit producing an output pulse in response to actuation of the said counter stage indicative of the presence of the next to last pulse of said train, said second circuit, in response to the termination of the pulse produced by said first circuit, producing a pulse for energizing all of said driver circuits, the timing and widths of said first and second circuits being arranged for providing dynamic braking subsequent to the energization of said driver circuits by said next to last pulse and prior to introduction of the last pulse of said train from said sequential actuating means to said driver circuits.

13. A logic system for stopping a stepping motor comprising means for producing a train of spaced pulses at a regular repetition rates, means for terminating operation of said pulse train producing means when the pulse train produced thereby contains a preselected number of pulses, driving circuit means connected for energizing said stepping motor, coupling means for introducing energizing pulses to said driving circuit means with one input to said coupling means being the output of said pulse train producing means and, a plurality of single pulse producing means each responsive to said terminating means for introducing to the input of said coupling means a single pulse occurring subsequent to termination of the pulse train, the pulses produced by said plurality of single pulse producing means being timed to occur serially for decelerating the rotor of said motor with the last single pulse corresponding to the stepping position at which the motor is to be stopped.

14. A system in accordance with claim 13 wherein said terminating means is a binary counter including a plurality of successively ordered counter stages arranged for counting the pulse from said pulse train producing means with the output of a high ordered counter stage providing the signal for terminating operation of said pulse train producing means and for initiating operation of said plurality of single pulse producing means.

15. A logic system for stopping a stepping motor comprising means for producing a train of spaced pulses at a regular repetition rate, binary counter means including a plurality of successively ordered counter stages arranged for counting the pulses from said pulse train producing means with the output of a high ordered counter stage being coupled to said pulse producing means for terminating the pulse train produced thereby, driving circuit means connected for energizing said stepping motor, coupling means for introducing energizing pulses to said driving circuit means with one input to said coupling means being the output of said pulse train producing means, circuit means for producing an output pulse in response to the output of said high ordered counter stage, a plurality of single pulse producing means each operable in response to the end of the output pulse of said circuit means for introducing a pulse to said coupling means with the output pulse of at least one of said single pulse producing means being delayed relative to the end of the pulse from said circuit means so that the pulse from said plurality of single pulse means occur serially, said circuit means and said plurality of single pulse means being consrtucted and arranged to produce output pulses timed for providing non-oscillatory deceleration and stepping of the rotor of said motor.

16. A system for incrementally stepping a stepping motor comprising means for selectably producing at least one pulse corresponding to the incremental step to be obtained, driving circuit means connected for sequentially energizing said stepping motor, and logic means responsive to the output of said pulse producing means and including first, second and third circuit means, said first circuit means being constructed and arranged for applying at least one initial pulse from said pulse producing means to said driving circuit means for causing the rotor of said motor to rotate, said second circuit means being operable subsequent to said first circuit means for applying a pulse to said driving circuit means, the polarity and timing of the pulse produced by said second circuit means being arranged for decelerating said motor to substantially zero velocity when the rotor thereof has reached a position corresponding to the step position represented by the output from said pulse producing means, and said third circuit means being operable subsequent to said second circuit means for applying to said driving circuit means a pulse corresponding to the step position represented by the output of said pulse producing means for causing non-oscillatory holding of said rotor in such position.

17. A system for incrementally stepping a motor comprising, pulse train producing means, first, second and third binary trigger circuits each having first and second conduction states with said first binary trigger circuit changing state in response to each pulse of said train, first and second single pulse circuits each responsive to the pulses of said train for producing an output pulse delayed with respect to said train pulses, the output of said second single pulse circuit occuring subsequent to the output of said first single pulse circuit, first and second NOR circuits each responsive to a respective one of the two conducting stages of said first binary trigger circuit and each coupled to pass therethrough the output pulses from said first and second single pulse circuits whenever said first binary trigger circuit is in the associated conducting state, said second and third binary trigger circuits being constructed and arranged for changing the conduction stage thereof in response to one direction of change of the output level from said first and second NOR circuits respectively, and at least four driver circuits connected for energizing respective coils of said motor each of said driver circuits being operably sensitive to respective conduction states of said second and third binary trigger circuits, whereby for each pulse of the train, the motor will be accelerated, decelerated to substantially zero rotational velocity and held in the next stable incremental step position.

References Cited

UNITED STATES PATENTS

| | | | |
|---|---|---|---|
| 3,165,686 | 1/1965 | MacDonald | 318—171 X |
| 3,217,221 | 11/1965 | Heggen el al. | 318—171 |
| 3,219,897 | 11/1965 | Beltrami | 318—171 |
| 3,225,277 | 12/1965 | Foulger | 318—138 |
| 3,241,017 | 3/1966 | Madsen et al. | 318—138 |
| 3,263,141 | 7/1966 | Nicola | 318—138 |

ORIS L. RADER, *Primary Examiner.*

G. SIMMONS, *Assistant Examiner.*

UNITED STATES PATENT OFFICE
CERTIFICATE OF CORRECTION

Patent No. 3,328,658                        June 27, 1967

Leon J. Thompson

It is certified that error appears in the above identified patent and that said Letters Patent are hereby corrected as shown below:

Column 14, line 71, after "second" insert -- single --.
Column 15, line 12, "repetition rates" should read -- repetition rate --; line 67, "consrtucted" should read -- constructed --.

Signed and sealed this 23rd day of September 1969.

(SEAL)
Attest:

Edward M. Fletcher, Jr.                      WILLIAM E. SCHUYLER, JR.
Attesting Officer                             Commissioner of Patents